US012623886B2

(12) United States Patent
Minami

(10) Patent No.: US 12,623,886 B2
(45) Date of Patent: *May 12, 2026

(54) DYNAMIC LIFT-OFF CONTROL DEVICE, AND CRANE

(71) Applicant: TADANO LTD., Kagawa (JP)

(72) Inventor: Yoshimasa Minami, Kagawa (JP)

(73) Assignee: TADANO LTD., Kagawa (JP)

( * ) Notice: Subject to any disclaimer, the term of this patent is extended or adjusted under 35 U.S.C. 154(b) by 536 days.

This patent is subject to a terminal disclaimer.

(21) Appl. No.: 18/007,597

(22) PCT Filed: Jun. 3, 2021

(86) PCT No.: PCT/JP2021/021225

§ 371 (c)(1),
(2) Date: Dec. 1, 2022

(87) PCT Pub. No.: WO2021/246490

PCT Pub. Date: Dec. 9, 2021

(65) Prior Publication Data

US 2023/0227290 A1 Jul. 20, 2023

(30) Foreign Application Priority Data

Jun. 3, 2020 (JP) ................................ 2020-097023

(51) Int. Cl.
*B66C 13/06* (2006.01)
*B66C 13/16* (2006.01)
(Continued)

(52) U.S. Cl.
CPC ............ *B66C 13/063* (2013.01); *B66C 13/16* (2013.01); *B66C 13/46* (2013.01); *B66C 13/48* (2013.01);
(Continued)

(58) Field of Classification Search
None
See application file for complete search history.

(56) References Cited

U.S. PATENT DOCUMENTS 5,282,136 A 1/1994 Zui et al.
5,908,122 A * 6/1999 Robinett ............... B66C 13/063 901/17
(Continued)

FOREIGN PATENT DOCUMENTS

EP 0449329 A2 10/1991
EP 3640194 A1 4/2020
(Continued)

OTHER PUBLICATIONS

Peng, Kelvin, Anthony Garcia, and Aldo Ferri. "Modeling and control of crane payload lift-off and lay-down operations." FME Trans 44.3 (2016): 237-248. (Year: 2016).*
(Continued)

*Primary Examiner* — Maria S Ayad
(74) *Attorney, Agent, or Firm* — Paratus Law Group, PLLC

(57) ABSTRACT

A dynamic lift-off control device that is mounted on a crane including a boom and a winch for winding a wire rope and that controls dynamic lift-off of a suspended load, wherein: the dynamic lift-off control device comprises a load detection unit that detects a load acting on the boom, and a control unit that controls a winding action of the winch and a hoisting action of the boom; and the control unit controls the hoisting of the boom by using a control signal, which is generated on the basis of the change over time in the value detected by the load detection unit and to which a filter for attenuating a frequency component in a prescribed range, to suppress swaying of the suspended load is applied.

6 Claims, 10 Drawing Sheets

(51) Int. Cl.
*B66C 13/46* (2006.01)
*B66C 13/48* (2006.01)
*B66C 23/42* (2006.01)
*B66C 23/88* (2006.01)

(52) U.S. Cl.
CPC .............. *B66C 23/42* (2013.01); *B66C 23/88* (2013.01); *B66C 2700/0371* (2013.01)

(56) References Cited

U.S. PATENT DOCUMENTS 5,960,969 A * 10/1999 Habisohn .............. B66C 13/063 212/270
7,426,423 B2 * 9/2008 Schneider ............. B66C 13/063 700/218
7,627,393 B2 * 12/2009 Sawodny .............. B66C 13/063 700/228
7,648,036 B2 * 1/2010 Recktenwald ......... B25J 9/1638 212/273
7,850,024 B2 * 12/2010 Schneider ............. B66C 13/063 700/213
8,352,129 B2 * 1/2013 Yuan ....................... B66C 13/06 701/50
11,524,878 B2 * 12/2022 Wang ................... G05B 13/042
12,202,708 B2 * 1/2025 Minami ................ B66C 13/066
2005/0150854 A1 * 7/2005 Toudou ................. B66C 23/344 212/175
2008/0191504 A1 * 8/2008 Pollock ..................... B66C 1/08 294/65.5
2008/0275610 A1 * 11/2008 Terashima ............ B66C 13/063 700/55
2011/0006024 A1 * 1/2011 Schneider ............. B66C 13/063 212/272
2012/0312767 A1 * 12/2012 Bohnacker .............. B66C 13/46 701/50
2013/0213919 A1 * 8/2013 Kyllingstad ........... B66D 1/525 212/272
2016/0318739 A1 * 11/2016 Terata ................... B66C 15/065
2017/0275142 A1 * 9/2017 Yoda ..................... B66C 23/344
2018/0065834 A1 * 3/2018 Miyoshi .............. F15B 13/0433
2018/0111803 A1 * 4/2018 Yamaura ................. B66C 13/18
2019/0211530 A1 * 7/2019 Kaneta .................. E02F 9/2271
2019/0241407 A1 * 8/2019 Mori ...................... G01G 19/14
2020/0031633 A1 1/2020 Kanda et al.
2020/0307968 A1 * 10/2020 Hoshino ................. B66C 13/46
2021/0047151 A1 * 2/2021 Goto ........................ B66C 23/42
2021/0214194 A1 * 7/2021 Mizuki ................... B66C 13/22
2022/0098008 A1 * 3/2022 Minami ................ B66C 13/063
2022/0098009 A1 * 3/2022 Minami ................ B66C 23/905
2023/0264927 A1 * 8/2023 Minami ................ B66C 13/066 212/273
2023/0373761 A1 * 11/2023 Minami .................. B66C 15/06
2024/0077840 A1 * 3/2024 Minami ............. G05B 13/0265
2024/0151003 A1 * 5/2024 Takagawa ............. E02F 9/2228

FOREIGN PATENT DOCUMENTS

JP H01-256496 A 10/1989
JP H07-10469 A * 1/1995
JP H08-188379 A 7/1996
JP 2009062183 A * 3/2009
JP 2018-087069 A 6/2018
JP 2019-001584 A 1/2019
WO WO-2019066018 A1 * 4/2019 ........... B66C 13/063
WO WO 2019/167893 A1 9/2019

OTHER PUBLICATIONS

Vaughan, Joshua, and William Singhose. “Reducing multiple modes of vibration by digital filtering and input shaping.” Dynamic Systems and Control Conference. vol. 44182. 2010. (Year: 2010).*
Kiviluoto, Sami, Lasse Eriksson, and Heikki N. Koivo. “Modelling and control of vertical oscillation in overhead cranes.” 2015 American Control Conference (ACC). IEEE, 2015. (Year: 2015).*
Machine Translation of Japanese Publication, JP-H07-10469-A. (Year: 1995).*
Aug. 10, 2021, International Search Report issued for related PCT Application No. PCT/JP2021/021225.
Aug. 10, 2021, International Search Opinion issued for related PCT Application No. PCT/JP2021/021225.
May 24, 2024, European Search Report issued for related EP Application No. 21817598.2.

* cited by examiner

CHANGE IN LOAD DATA ON AML AT TIME OF DYNAMIC LIFT-OFF CHECK TEST

NOTCH FILTER CHARACTERISTICS $$\frac{s^2 + W_a^2}{s^2 + 2\zeta W_a s + W_a^2}$$

$W_a$: CENTER FREQUENCY TO BE REMOVED [rad/s]

$\zeta$: DAMPING CONSTANT

DYNAMIC LIFT-OFF CONTROL DEVICE, AND CRANE

CROSS REFERENCE TO PRIOR APPLICATION

This application is a National Stage Patent Application of PCT International Patent Application No. PCT/JP2021/021225 (filed on Jun. 3, 2021) under 35 U.S.C. § 371, which claims priority to Japanese Patent Application No. 2020-097023 (filed on Jun. 3, 2020), which are all hereby incorporated by reference in their entirety.

TECHNICAL FIELD

The present invention relates to a dynamic lift-off control device and a crane for suppressing a load swing when lifting a suspended load from the ground.

BACKGROUND ART

In the related art, in a crane including a boom, when a suspended load is lifted from the ground, that is, when the suspended load is dynamically lifted off, a work radius is increased due to deflection of the boom, so that "load swing" in which the suspended load swings in a horizontal direction has been a problem (see FIG. 1).

For the purpose of preventing load swing at the time of dynamic lift-off, for example, a vertical dynamic lift-off control device described in Patent Literature 1 is configured to detect the rotation speed of the engine by an engine rotation speed sensor and correct the hoisting operation of the boom to a value according to the engine rotation speed.

CITATION LIST

Patent Literature

Patent Literature 1: JP 8-188379 A

SUMMARY OF THE INVENTION

Problems to be Solved by the Invention

Meanwhile, in the conventional dynamic lift-off control device including Patent Literature 1, in order to keep the work radius constant, control is performed using a winch actuator and a derricking actuator in combination. Therefore, there is a problem that it takes time to perform the dynamic lift-off due to complicated control.

Therefore, an object of the present invention is to provide a dynamic lift-off control device capable of quickly dynamically lifting off the suspended load while suppressing the load swing, and a crane including the dynamic lift-off control device.

Solutions to Problems

In an aspect of the dynamic lift-off control device according to the present invention, the dynamic lift-off control device is mounted on a crane including a boom and a winch for winding a wire rope and that controls dynamic lift-off of a suspended load, wherein the dynamic lift-off control device includes a load detection unit that detects a load acting on the boom, and a control unit that controls a winding action of the winch and a hoisting action of the boom, and the control unit controls the hoisting of the boom by using a control signal, which is generated on the basis of the change over time in the value detected by the load detection unit and to which a filter for dampening a frequency component in a predetermined range is applied, to suppress swaying of the suspended load.

Effects of the Invention

According to the present invention, it is possible to provide the dynamic lift-off control device capable of quickly dynamically lifting off the suspended load while suppressing the load swing, and the crane including the dynamic lift-off control device.

DESCRIPTION OF EMBODIMENTS

Hereinafter, an example of an embodiment according to the present invention will be described with reference to the drawings. However, the components described in the following embodiments are merely examples, and the technical scope of the present invention is not limited thereto.

Embodiment

In the present embodiment, examples of the mobile crane include a rough terrain crane, an all-terrain crane, and a truck crane. Hereinafter, a rough terrain crane will be described as an example of the work vehicle according to the present embodiment, but the dynamic lift-off control device according to the present invention can also be applied to another mobile crane. Furthermore, the dynamic lift-off control device according to the present invention can also be applied to a crawler crane or a tower crane.

Configuration of Mobile Crane

Figure 1:
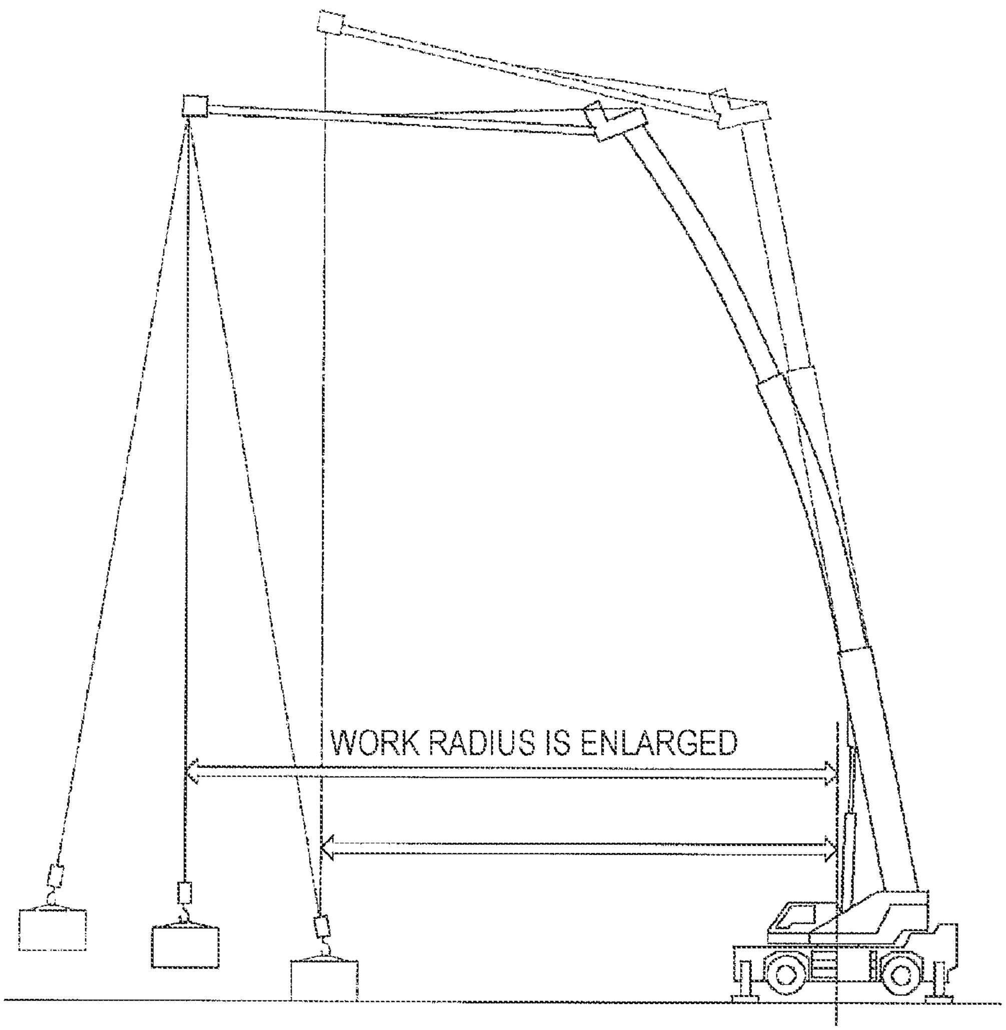
FIG. 1 is an explanatory view for explaining load swing of a suspended load.
Figure 2:
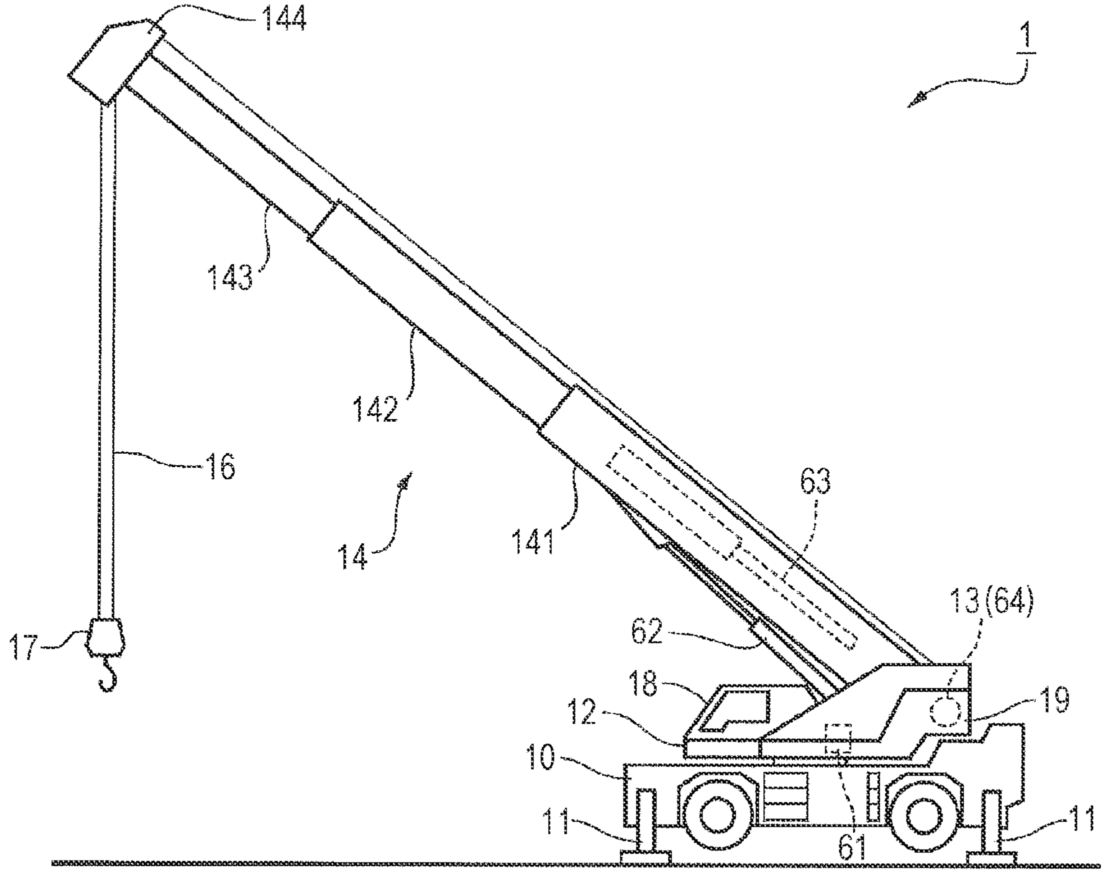
FIG. 2 is a side view of a mobile crane.

First, the configuration of the mobile crane will be described with reference to FIG. 2. As illustrated in FIG. 2, a rough terrain crane 1 of the present embodiment includes a vehicle body 10 serving as a main body portion of a vehicle having a traveling function, outriggers 11 provided at four corners of the vehicle body 10, a turning table 12 attached to the vehicle body 10 so as to be horizontally turnable, and a boom 14 attached to the rear of the turning table 12.

The outrigger 11 can be slidably extended/slidably stored outward in the width direction from the vehicle body 10 by expanding and contracting the slide cylinder, and can be jack-extended/jack-stored in the vertical direction from the vehicle body 10 by expanding and contracting the jack cylinder.

The turning table 12 includes a pinion gear to which power of the turning motor 61 is transmitted, and the pinion gear meshes with a circular gear provided on the vehicle body 10 to turn about a turning shaft. The turning table 12 includes an operator's seat 18 disposed on the right front side and a counterweight 19 disposed on the rear side.

Furthermore, a winch 13 for winding up and winding down a wire rope 16 is disposed behind the turning table 12. The winch 13 rotates in two directions of a winding up direction (winding direction) and a winding down direction (unwinding direction) by rotating a winch motor 64 in the forward direction or the reverse direction.

The boom 14 is configured in a telescopic manner by a proximal end boom 141, an intermediate boom (or booms) 142, and a distal end boom 143, and is expanded and contracted by a telescopic cylinder 63 disposed therein. A sheave is disposed on a most distal boom head 144 of the distal end boom 143, and the wire rope 16 is hung on the sheave to suspend a hook 17.

A proximal end portion of the proximal end boom 141 is rotatably attached to a support shaft installed on the turning table 12. The proximal end boom 141 can be is derricked up and down about a support shaft as a rotation center. A derricking cylinder 62 is stretched between the turning table 12 and the lower face of the proximal end boom 141. By extending and contracting the derricking cylinder 62, the entire boom 14 is derricked.

Configuration of Control System

Figure 3:
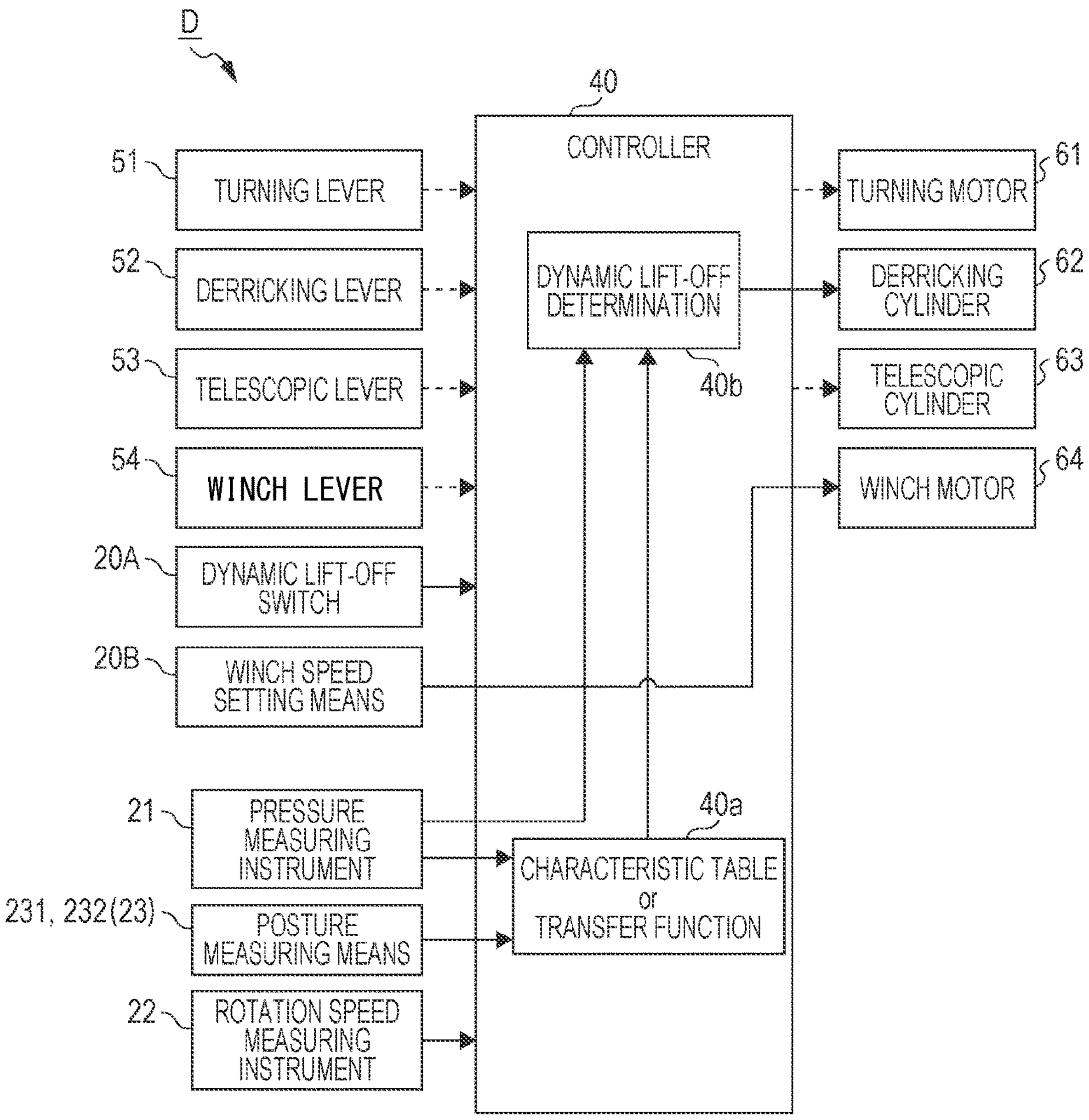
FIG. 3 is a block diagram of a dynamic lift-off control device.

Next, a configuration of a control system of a dynamic lift-off control device D of the present embodiment will be described with reference to a block diagram of FIG. 3. The dynamic lift-off control device D is mainly configured by a controller 40 as a control unit. The controller 40 is a general-purpose microcomputer having an input port, an output port, an arithmetic device, and the like. The controller 40 receives an operation signal from operation levers 51 to 54 (a turning lever 51, a derricking lever 52, a telescopic lever 53, a winch lever 54) and controls the actuators 61 to 64 (a turning motor 61, the derricking cylinder 62, the telescopic cylinder 63, the winch motor 64) via a control valve not illustrated.

Furthermore, the controller 40 of the present embodiment is connected to a dynamic lift-off switch 20A for starting or stopping the dynamic lift-off control, a winch speed setting means 20B for setting the speed of the winch 13 in the dynamic lift-off control, a pressure measuring instrument 21 as a load detection unit for detecting a load acting on the boom 14, a posture measuring means 23 for detecting posture information of the boom 14, and a rotation speed measuring instrument 22 for measuring the rotation speed of the which 13. The posture measuring means 23 corresponds to an example of a posture detection unit.

The dynamic lift-off switch 20A is an input device for instructing to start or stop the dynamic lift-off control. For example, the dynamic lift-off switch 20A may be added to a safety device of the rough terrain crane 1. Preferably, the dynamic lift-off switch 20A is disposed at the operator's seat 18.

The winch speed setting means 20B is an input device that sets the speed of the winch 13 in the dynamic lift-off control. The winch speed setting means 20B may be of a type of selecting an appropriate speed from preset speeds, or of a type of inputting with a numeric keypad. Further, the winch speed setting means 20B may be configured to be added to the safety device of the rough terrain crane 1, as in the dynamic lift-off switch 20A. The winch speed setting means 20B is preferably disposed at the operator's seat 18. By adjusting the speed of the winch 13 by the winch speed setting means 20B, the time required for the dynamic lift-off control can be adjusted.

The pressure measuring instrument 21 as a load detection unit is a measuring instrument that measures a load acting on the boom 14. The pressure measuring instrument 21 is, for example, a pressure gauge that measures the pressure acting on the derricking cylinder 62. A pressure signal measured by the pressure measuring instrument 21 is transmitted to the controller 40.

The rotation speed measuring instrument 22 is installed near the rotation axis of the winch (drum) 13 to measure the number of rotations (rotation speed) of the winch (drum) 13. The number of rotations (rotation speed) measured by the rotation speed measuring instrument 22 is transmitted to the controller 40 and used for calculating the winch winding-up speed and the length of the wire rope.

The posture measuring means 23 is a measuring instrument that detects posture information of the boom 14, and includes a derricking angle meter 231 that measures a derricking angle of the boom 14 and a derricking angular velocity meter 232 that measures a derricking angular velocity. Specifically, the derricking angle meter 231 is, for example, a potentiometer. The derricking angular velocity meter 232 is, for example, a stroke sensor attached to the derricking cylinder 62. The derricking angle signal measured by the derricking angle meter 231 and the derricking angular velocity signal measured by the derricking angular velocity meter 232 are transmitted to the controller 40.

The controller 40 is a control unit that controls operations of the boom 14 and the winch 13. When the dynamic lift-off switch 20A is turned ON to wind up the winch 13 to dynamically Lift off the suspended load, the controller 40 predicts the amount of change in the derricking angle of the boom 14 on the basis of the change over time in the load measured by the pressure measuring instrument 21 as the load detection unit, and hoists the boom 14 to compensate for the predicted amount of change.

More specifically, the controller 40 corresponds to an example of a control unit, and includes, as function units, a selection function unit 40*a* of a characteristic table or a transfer function and a dynamic lift-off determination function unit 40*b* that stops the dynamic lift-off control by determining whether the dynamic lift-off has actually been performed.

The characteristic table or transfer function selection function unit 40*a* receives the input of the initial value of the pressure from the pressure measuring instrument 21 as the load detection unit and the initial value of the derricking angle from the derricking angle meter 231 as the posture detection unit, and determines the characteristic table or transfer function to be applied. Here, as the transfer function, a relationship using the linear coefficient a can be applied as follows.

Figure 9:
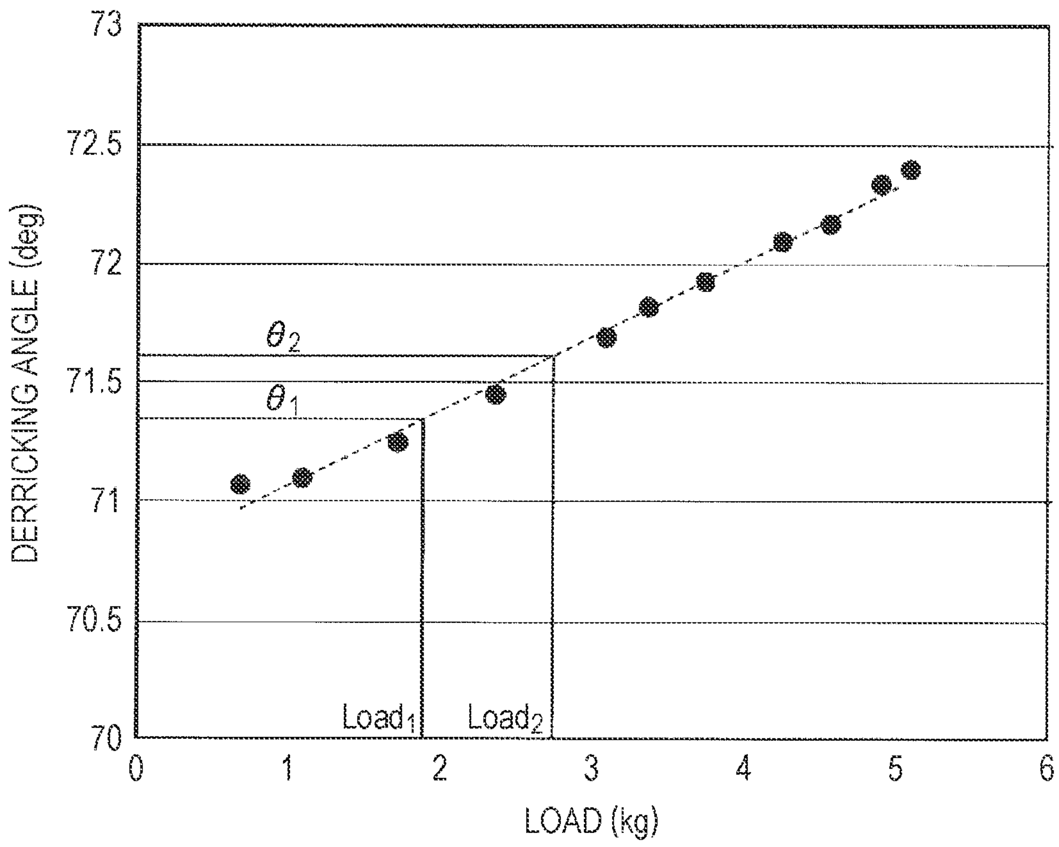
FIG. 9 is a graph illustrating a relationship between a load and a derricking angle.

First, as shown in the load-derricking angle graph of FIG. 9, it is found that the load and the derricking angle (distal end angle with respect to the ground) have a linear relationship when the boom distal end position is adjusted so as to be always directly above the suspended load so as not to cause the load swing. Assuming that the load $Load_1$ changes to $Load_2$ during the dynamic lift-off from time $t_1$ to time $t_2$, the relationship between the derricking angle $\theta$ and the load Load, the relationship between the derricking angle $\theta_1$ and the load $Load_1$, and the relationship between the derricking angle $\theta_2$ and the load $Load_2$ are expressed by the following equations.

$$\text{APPROXIMATE EXPRESSION} \quad \theta = a \cdot \text{Load} + b \quad \text{[Math. 1]}$$

$$t_1 \qquad \theta_1 = a \cdot \text{Load}_1 + b$$

$$t_2 \qquad \theta_2 = a \cdot \text{Load}_2 + b$$

The difference between the two equations is expressed by the following equation by a difference equation.

$$\theta_2 - \theta_1 = a(\text{Load}_2 - \text{Load}_1) \quad \text{[Math. 2]}$$

$$\Delta\theta = a \cdot \Delta\text{Load}$$

In order to control the derricking angle, it is necessary to give a derricking angular velocity represented by the following equation.

$$V_{Dm} = \frac{\Delta\theta}{(t_2 - t_1)} = a \cdot \frac{\Delta\text{Load}}{\Delta t} = a \cdot \hat{L}_{Load} \quad \text{[Math. 3]}$$

where, a is a constant (linear coefficient).

That is, in the derricking angle control, the change over time (differential) in the load is input.

The lifting off of the dynamic lift-off determination function unit 40*b* monitors time series data of the value of the load calculated from the pressure signal from the pressure measuring instrument 21 as the load detection unit, and determines the presence or absence of the dynamic lift-off. A method of the dynamic lift-off determination will be described later with reference to FIG. 8.

(Overall Block Diagram)

Figure 4:
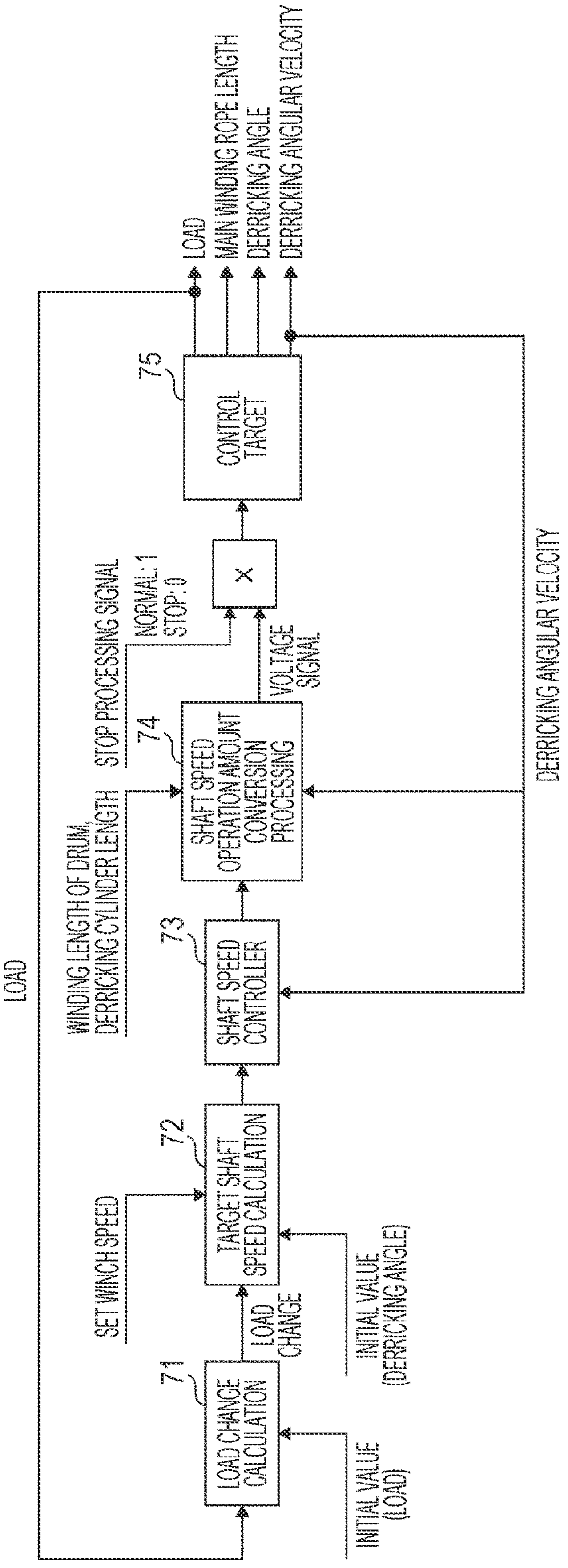
FIG. 4 is as overall block diagram of the dynamic lift-off control device.

Next, with reference to a block diagram of FIG. 4, an input/output relationship between all elements including the dynamic lift-off control according to the present embodiment will be described in detail. First, a load change calculation unit 71 calculates a load change on the basis of time series data of a load measured by the pressure measuring instrument 21 as a load detection unit. The calculated load change is input to a target shaft speed calculation unit 72. The input/output relationship in the target shaft speed calculation unit 72 will be described later with reference to FIG. 5.

The target shaft speed calculation unit 72 calculates a target shaft speed on the basis of the initial value of the derricking angle, the set winch speed, and the input load change. Here, the target shaft speed is a target derricking angular velocity (and, although not required, the target winch speed). The calculated target shaft speed is input to a shaft speed controller 73. The first half control up to this point is processing related to the dynamic lift-off control of the present embodiment.

Thereafter, the operation amount is input to a control target 75 via the shaft speed controller 73 and a shaft speed operation amount conversion processing unit 74. The latter half control of is a process related to normal control, and is feedback-controlled on the basis of the measured derricking angular velocity.

(Block Diagram of Dynamic Lift-Off Control)

Figure 5:
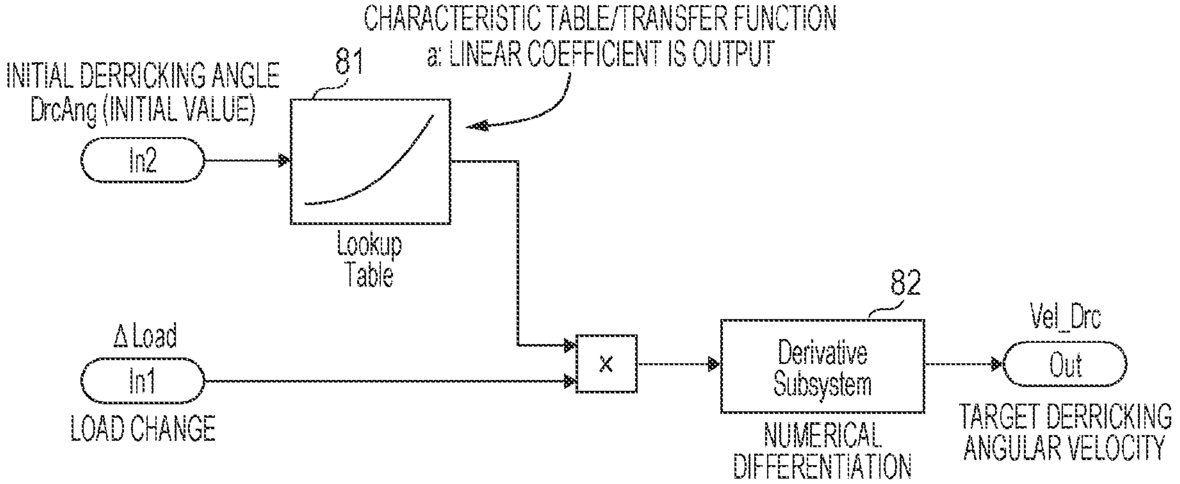
FIG. 5 is a block diagram of dynamic lift-off control.

Next, an input/output relationship between elements in the target shaft speed calculation unit 72 of the dynamic lift-off control in particular will be described with reference to a block diagram of FIG. 5. First, an initial value of the derricking angle is input to a characteristic table/transfer function selection function unit 81 (40*a*). In the selection function unit 81, the most appropriate constant (linear coefficient) a is selected using the characteristic table (LookupTable) or the transfer function (equation).

Then, numerical differentiation (differentiation with respect to time) of the load change is performed in a numerical differentiation unit 82, and the target derricking angular velocity is calculated by multiplying the result of the numerical differentiation by the constant a. That is, the target derricking angular velocity is calculated by executing the calculation of (equation 3) described above. As described above, the control of the target derricking angular velocity is feedforward-controlled using the characteristic table (or the transfer function).

(Block Diagram of Application of Band Removal Filter)

Figure 6:
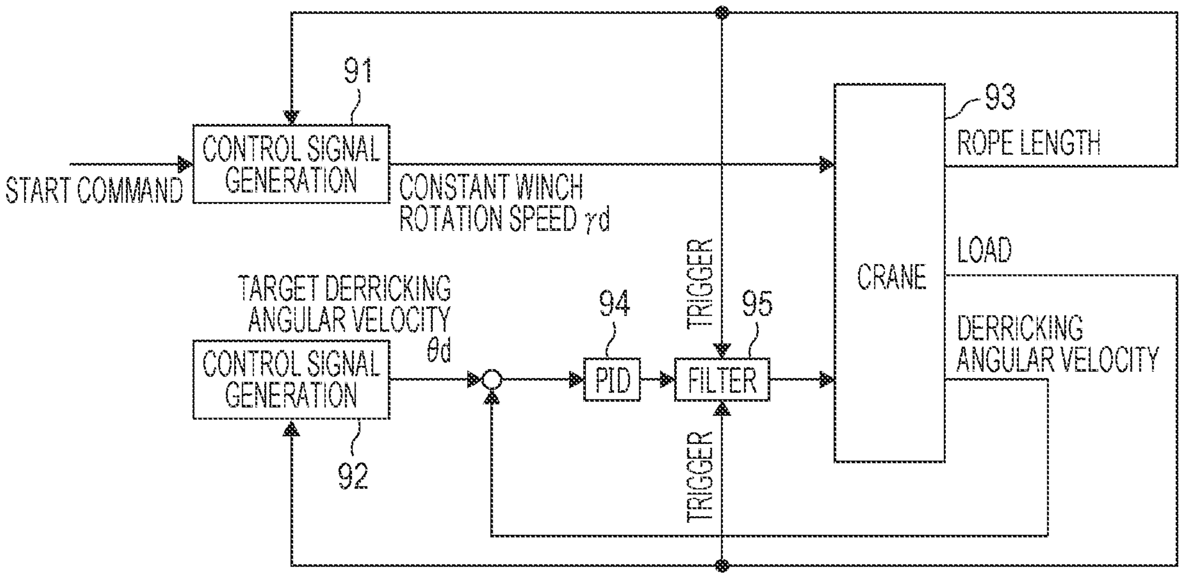
FIG. 6 is a block diagram related to application of a band removal filter.

Next, an operation of applying a band removal filter that dampens a predetermined band when generating the derricking angular velocity control signal on the basis of the target derricking angular velocity (the derricking angular velocity target value) will be described with reference to the block diagram of FIG. 6. First, a first control signal generation unit 91 instructs a crane 93 (winch motor 64) to be controlled to maintain the speed of the winch 13 at a constant rotational speed γd by the start command. The winch speed control is feedback-controlled on the basis of the measured rope length. On the other hand, the measured rope length is used for the dynamic lift-off determination to trigger activation of a filter application unit 95.

Thereafter, a second control signal generation unit 92 instructs a PID control unit 94 on the target derricking angular velocity on the basis of the target derricking angle θd and the measured derricking angular velocity. The PID control unit 94 generates a derricking angular velocity control signal by PID control. That is, the derricking angular velocity control signal generated on the basis of the difference between the measured derricking angular velocity and the target derricking angular velocity. This derricking angular velocity control is feedback-controlled on the basis of the measured load and the measured derricking angular velocity (see FIGS. 4 and 5). On the other hand, the measured load (pressure value) is used for the dynamic lift-off determination to trigger activation of the filter application unit 95.

Then, the controller 40 determines the presence or absence of the dynamic lift-off on the basis of the time series data of the measured rope length or the time series data of the measured load (pressure value). When the controller 40 determines that the dynamic lift-off has been completed, the filter application unit 95 applies a band removal filter that dampens a predetermined band to the derricking angular velocity control signal. When the controller 40 determines that the dynamic lift-off is not completed, the filter application unit 95 does not apply the band removal filter to the derricking angular velocity control signal. Note that the filter application unit 95 may always apply the band removal filter to the derricking angular velocity control signal regardless of whether the dynamic lift-off is completed.

Then, a band removal filter (band stop filter) is applied when the derricking angular velocity control signal is generated. The band removal filter has a frequency characteristic in which most frequencies are passed as it is, but only frequency components in a predetermined range are dampened to a very low level. The band removal filter preferably includes a notch filter having a narrow stop band. In the following embodiment, a specific example in which the notch filter is applied will be described, but this is an example, and other band removal filters can also be used.

Figure 10:
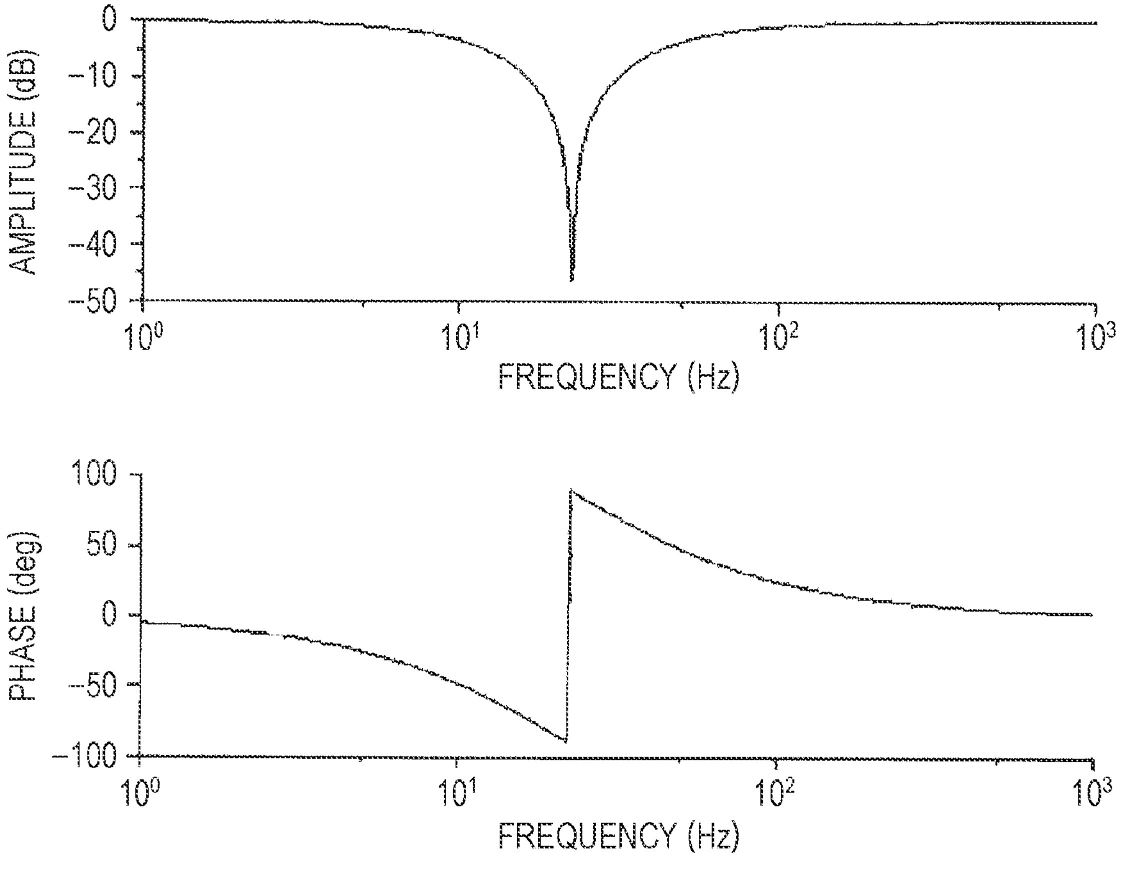
FIG. 10 is an explanatory diagram of notch filter characteristics.

Here, characteristics of the notch filter are illustrated in an explanatory diagram of FIG. 10. As illustrated in FIG. 10, when the notch filter is applied, the amplitude is greatly dampened before and after the center frequency. When the notch filter is applied, a phase delay characteristic is obtained at the lower frequency than the center frequency, and a phase advance characteristic is obtained at the higher frequency. The natural frequency of the boom 14 varies depending on the state of the boom 14. The state of the boom 14 is, for example, a length of the boom 14 and/or a telescopic pattern of the boom 14. That is, when the telescopic pattern of the boom 14 is different even when the length of the boom 14 is the same, the natural frequency of the boom 14 is different. Here, in the mobile crane, it is preferable to calculate and measure the natural frequency for each length and/or for each telescopic pattern of the boom 14 in advance and store the natural frequency. That is, the storage unit of the mobile crane preferably stores the natural frequency in association with the length and/or the telescopic pattern of the boom 14. It is preferable that the natural frequency of the work vehicle is actually measured for each vehicle when the work vehicle is shipped from the factory.

(Flowchart)

Figure 7:
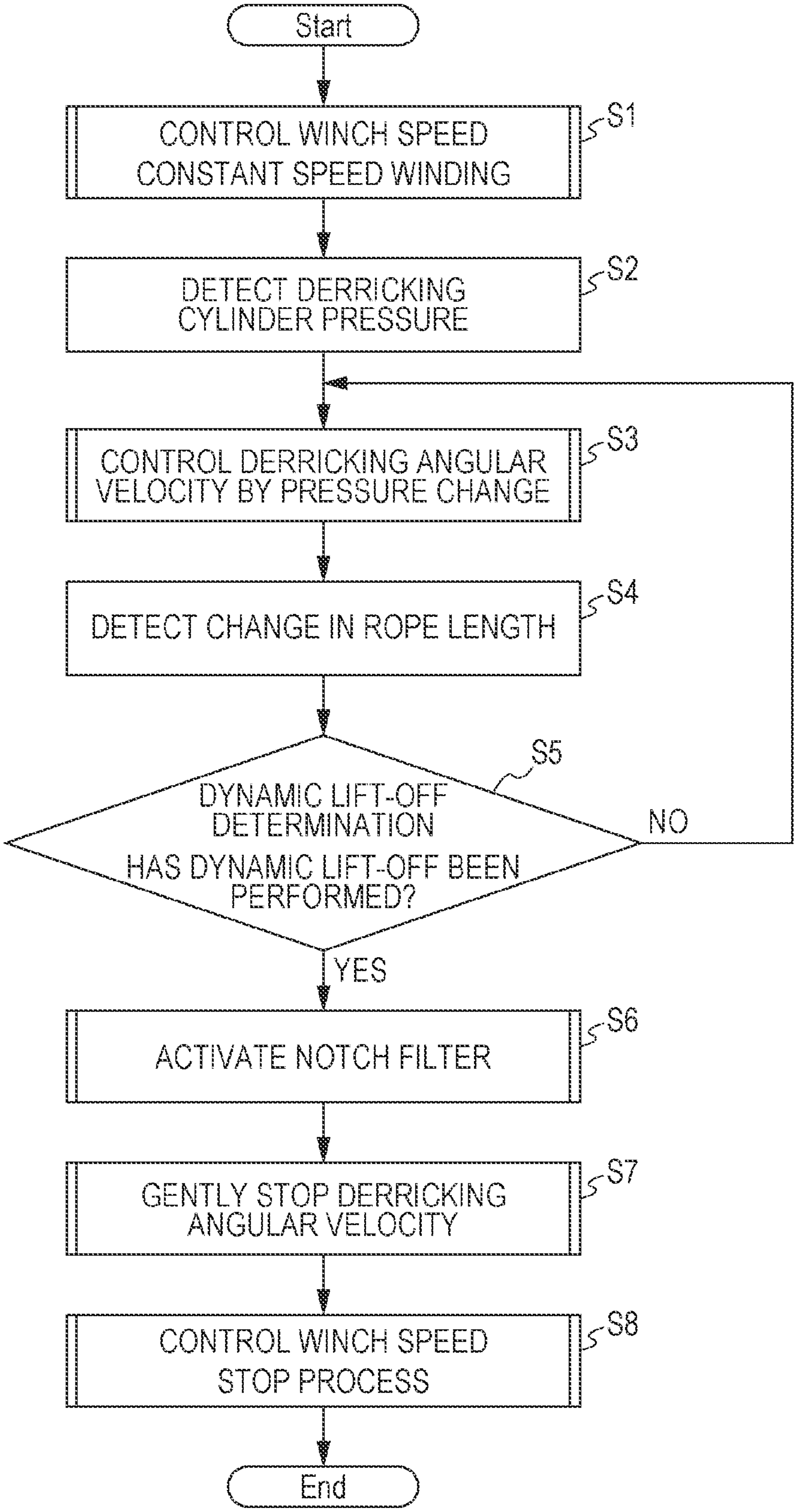
FIG. 7 is a flowchart of the dynamic lift-off control.

Next, the overall flow of the dynamic lift-off control of the present embodiment will be described with reference to the flowchart of FIG. 7.

First, the operator presses the dynamic lift-off switch 20A to start the dynamic lift-off control (START). At this time, the target speed of the winch 13 is set via the winch speed setting means 20B before or after the start of the dynamic lift-off control in advance. Then, the controller 40 starts winch control at the target speed (step S1). This target speed is, for example, a constant speed.

Next, at the same time as the winch 13 is wound up, measurement of a suspended load (detection of a derricking cylinder pressure) is started by the pressure measuring instrument 21 as a load detection unit, and a load value (pressure value) is input to the controller 40 (step S2).

Next, the selection function unit 40*a* receives the input of the initial value of the load value (pressure value) and the initial value of the derricking angle from the derricking angle meter 231 as the posture detection unit, and determines the characteristic table or the transfer function to be applied (step S3). Next, the controller 40 calculates the derricking angular velocity on the basis of the applied characteristic table or transfer function and the load change (step S3). That is, the derricking angular velocity control is performed by the feedforward control.

Next, a time-series change in the rope length is detected for use in the subsequent dynamic lift-off determination (step S4). Specifically, the controller 40 receives a measurement result of the rotation speed measured by the rotation speed measuring instrument 22 and the posture (derricking angle, derricking angular velocity, boom length) measured by the posture measuring means 23 to calculate the rope length, and the time-series change is monitored.

Then, the controller 40 determines the presence or absence of the dynamic lift-off on the basis of the time series data of the measured load and/or rope length (step S5). The determination method will be described later. As a result of the determination, when the dynamic lift-off has not been performed (NO in step S5), the process returns to step S3 to repeat the feedforward control based on the load (steps S3 to S5).

As a result of the determination, when the dynamic lift-off is completed (YES in step S5), the notch filter is activated when the gentle stop control is performed (step S6). That is, the controller 40 applies the notch filter (band removal filter) when generating the derricking angular velocity control signal on the basis of the derricking angular velocity target value in the gentle stop of the derricking action after the dynamic lift-off. At this time, a notch filter according to the length of the boom 14 is selected as the notch filter to be applied. Note that the timing at which the notch filter is applied can be applied only for a predetermined time or for a time for which a prescribed number of times of vibration is measured from the time at which it was determined that the dynamic lift-off has been performed. The generated derricking angular velocity control signal is used in the next step S7.

Next, the dynamic lift-off control is gently stopped using the derricking angular velocity control signal after the notch filter is applied (step S7). That is, the hoisting action of the boom 14 by the derricking cylinder 62 is stopped while gradually reducing the speed (step S7). The gentle stop can be realized, for example, by linearly decreasing the angular velocity. Here, in the present embodiment, when the hoisting drive is stopped while reducing the speed (that is, when the derricking angular velocity is gently stopped), the vibration is suppressed by moving the boom 14 so as to avoid the natural frequency of the boom 14.

Here, the natural frequency of the boom 14 varies depending on the boom length, but in the present embodiment, the natural frequency can be expressed by a function on the basis of the measurement data, so that it is possible to be adapted to an any boom length and/or a telescopic pattern. Furthermore, in the present embodiment, the rotational speed of the winch 13 and the derricking angle of the derricking cylinder 62 are controlled, and one feature is that the winch 13 is operated at a constant speed and only the derricking angle is required to be gently stopped as a control target.

Finally, the rotational driving of the winch 13 by the winch motor is stopped while reducing the speed (step S8). In this way, the dynamic lift-off control is ended (END).

(Dynamic Lift-Off Determination 1)

Next, a method of the dynamic lift-off determination of the present embodiment will be described with reference to the graph of FIG. 8. In the present embodiment, the controller 40 monitors time series data of the measured load while winding up the winch 13 in the dynamic lift-off control, and determines that the dynamic lift-off has been performed by capturing the first maximum value of the time series data.

Figure 8:
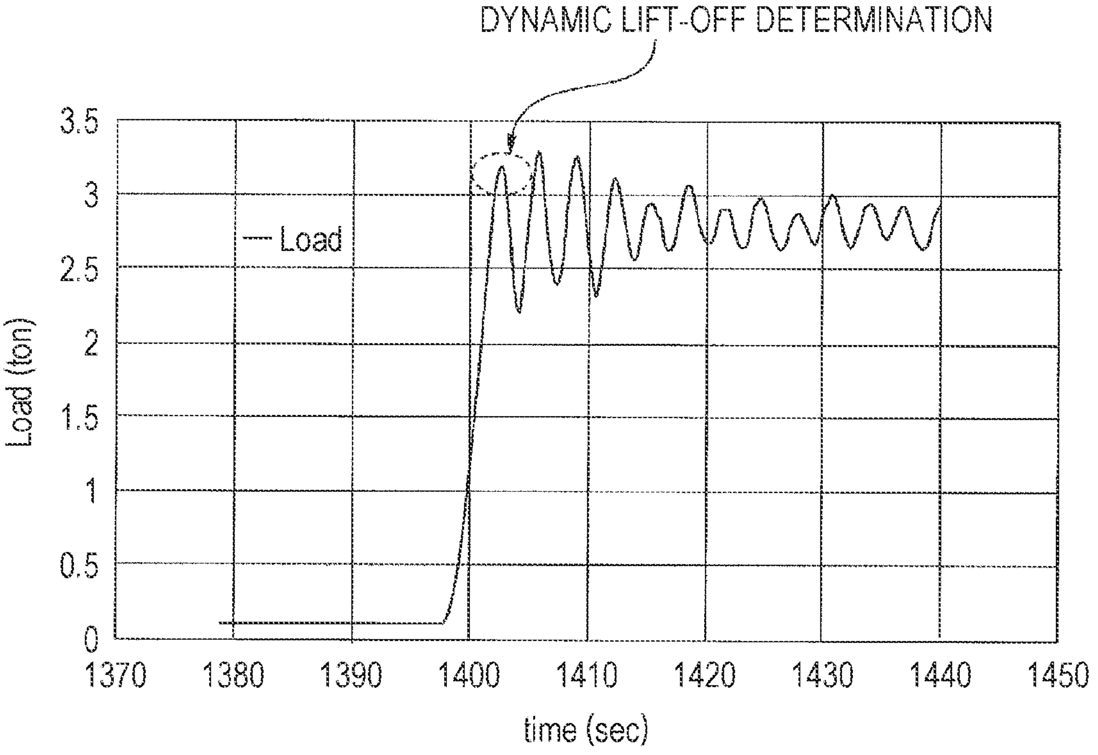
FIG. 8 is a graph for explaining a method of a dynamic lift-off determination.

More specifically, as shown in FIG. 8, in general, the time series data of the load data overshoots at the next moment after the dynamic lift-off has been performed, undershoots further, and then transitions to continue to vibrate. Therefore, it is possible to determine that the dynamic lift-off has been performed by capturing the time of the first of vibration, that is, the first maximum value. However, actually, it is conceivable that at the time when it is determined that the dynamic lift-off is performed, that is, at the time when the first maximum value is recorded, the slight overshoot due to the inertial force occurs.

The load data illustrated in FIG. 8 is a measurement value of the pressure measuring instrument 21 or a value (hereinafter, it is simply referred to as a "measurement value of the pressure measuring instrument 21") calculated on the basis of the measurement value of the pressure measuring instrument 21. That is, the measurement value of the pressure measuring instrument 21 changes (vibrates) so as to repeat vertical movement after the dynamic lift-off has been performed. Such a change (vibration) in the measurement value of the pressure measuring instrument 21 is affected by the natural frequency of the boom 14. Therefore, the natural frequency of the boom 14 can be calculated on the basis of the change (vibration) in the measurement value of the pressure measuring instrument 21. The natural frequency thus calculated may be applied to the above-described band removal filter (notch filter) as the center frequency.

(Dynamic Lift-Off Determination 2)

In addition to the above method, the controller 40 of the present embodiment can be configured to determine the dynamic lift-off on the basis of a change over time in the measured load and a change over time in the measured rope length when dynamically lifting off the suspended load by winding up the winch 13 in the dynamic lift-off control.

Specifically, when dynamically lifting off the suspended load by winding up the winch 13, the controller 40 as the control unit determines that the dynamic lift-off has been performed when a rope length is shorter than a threshold value set from an rope length with a rope length at the time when the measured load starts changing as the initial rope length.

Alternatively, when dynamically lifting off the suspended load by winding up the winch 13, the controller 40 as the control unit determines that the dynamic lift-off has been performed when the winding speed, which is the change over time in the rope length, is faster than a threshold value set from an winding speed with the change over time in the rope length at the time when the measured load starts to change as the initial winding speed.

Effects

Next, effects obtained by the dynamic lift-off control device D of the present embodiment will be listed and described.

(1) As described above, the dynamic lift-off control device D of the present embodiment includes the boom 14, the winch 13, the pressure measuring instrument 21, and the controller 40 as the control unit that controls the boom 14 and the winch 13, the controller 40 obtaining the amount of change in the derricking angle of the boom 14 on the basis of the change over time in the measured load when dynamically lifting off the suspended load by winding up the winch 13 load and hoisting the boom 14 to compensate for the amount of change, and the controller 40 applies the band removal filter that dampens the predetermined band when generating the derricking angular velocity control signal on the basis of the derricking angular velocity target value in the gentle stop of the derricking action after the dynamic lift-off. With such a configuration, it is possible to provide the dynamic lift-off control device D capable of quickly dynamically lifting off the suspended load while suppressing the load swing.

That is, in the dynamic lift-off control device D of the present embodiment, focusing on the linear relationship between the load and the derricking angle-compensation amount, it is possible to quickly dynamically lift off the suspended load by performing the feedforward control on the basis of the change over time in the load value without performing the complicated feedback control as in the related art.

In the dynamic lift-off control device D of the present embodiment, the vibration is suppressed by moving the boom 14 so as to avoid the natural frequency of the boom 14 using the function of the natural frequency according to the boom length in particular, when it is determined that the dynamic lift-off has been performed and the derricking angular velocity is gently stopped. Specifically, for example, the vibration is suppressed while the boom 14 is gently stopped by an operation of temporarily increasing and then decreasing the hoisting speed of the boom.

(2) Preferably, controller 40 calculates a dampening predetermined band on the basis of the natural frequency of boom 14 according to the length of boom 14. With such a configuration, by dampening the band around the actual natural frequency of the boom 14, it is possible to efficiently suppress the vibration and quickly end the dynamic lift-off control.

(3) Further, the controller 40 applies the band removal filter only for a predetermined time after determining that the dynamic lift-off has been performed. With such a configuration, it is possible to prevent the phase of the derricking angular velocity from being delayed in a scene other than the dynamic lift-off.

(4) In addition, it is preferable that the posture measuring means 23 that detects posture information of the boom 14 is further included, and the controller 40 selects a corresponding characteristic table or transfer function on the basis of the initial value of the measured posture of the boom 14 and the initial value of the measured load, and obtains the amount of change in the derricking angle of the boom 14 from the change over time in the measured load using the characteristic table or the transfer function.

With this configuration, at the start of the dynamic lift-off control, the winch 13 is wound up at a constant speed, and the amount of control of the hoisting angle is calculated from the characteristic table (or the transfer function) in accordance with the load change to perform the feedforward control, so that the dynamic lift-off can be promptly performed without the load swing. In addition, since the number of parameters to be adjusted is reduced, adjustment at the time of shipment can be quickly and easily performed.

(5) Furthermore, it is preferable that the controller 40 is configured to wind up the winch 13 at a constant speed when dynamically lifting off the suspended load by winding up the winch 13. With this configuration, the influence of the disturbance such as the inertial force is suppressed, and the response (measured load value) is stabilized, so that the dynamic lift-off determination can be easily made.

(6) Preferably, the controller 40 is configured to adjust the time required for the dynamic lift-off by adjusting the speed of the winch 13 when dynamically lifting off the suspended load by winding up the winch 13. With this configuration, it is possible to work safely and efficiently by selecting an appropriate speed of the winch 13 according to the weight of the suspended load and the environmental conditions.

(7) Furthermore, the controller 40 of the present embodiment is configured to monitor time series data of the measured load and determine that the dynamic lift-off has been performed by capturing the first maximum value of the time series data when dynamically lifting off the suspended load by winding up the winch 13. By performing the control only on the basis of the load in this manner, it is possible to easily and quickly determine the dynamic lift-off.

(8) In addition, the rough terrain crane 1, which is the mobile crane of the present embodiment, is provided with the above-described dynamic lift-off control device D, so that the rough terrain crane 1 capable of quickly dynamically lifting off the suspended load while suppressing the load swing.

Although the embodiment of the present invention is described in detail with reference to the drawings, the specific configuration is not limited to the embodiment, and a design change that does not depart from the gist of the present invention is included in the present invention.

For example, although not specifically described in the embodiment, the dynamic lift-off control device D of the present invention can be applied to both the case of performing the dynamic lift-off using the main winch as the winch 13 and the case of performing the dynamic lift-off using the sub winch.

INDUSTRIAL APPLICABILITY

The dynamic lift-off control device according to the present invention can be applied not only to the mobile crane but also to various cranes.

REFERENCE SIGNS LIST

D dynamic lift-off control device
a linear coefficient
1 rough terrain crane
10 vehicle body
12 turning table
13 winch
14 boom
16 wire rope
17 hook
20A dynamic lift-off switch
20B winch speed setting means
21 pressure measuring instrument
22 rotation speed measuring instrument
23 posture detection means
231 derricking angle meter
232 derricking angular velocity meter
40 controller
40*a* selection function unit
40*b* dynamic lift-off determination function unit
51 turning lever
52 derricking lever
53 telescopic lever
54 winch lever
61 turning motor
62 derricking cylinder
63 telescopic cylinder
64 winch motor
91 first control signal generation unit
92 second control signal generation unit
93 crane (control target)
94 PID control unit
95 filter application unit

The invention claimed is:

1. A dynamic lift-off control device that is mounted on a crane including a boom and a winch for winding a wire rope and that controls dynamic lift-off of a suspended load, the dynamic lift-off control device comprising:
- a load detection unit that detects a load acting on the boom;
- a control unit that controls a winding action of the winch and a derricking action of the boom based on a control signal; and
- a filter application unit that applies a filter for dampening a frequency component in a predetermined range to the control signal,
- wherein the control unit:
  - predicts an amount of change in a derricking angle of the boom required to move a distal end of the boom directly above the suspended load, based on a change over time in the load detected by the load detection unit;
  - calculates a target derricking angular velocity according to the predicted amount of change in the derricking angle;
  - generates the control signal based on the calculated target derricking angular velocity;
  - when the dynamic lift-off has not been completed, controls the derricking action of the boom to suppress horizontal swaying of the suspended load by using the control signal to which the filter is not applied by the filter application unit; and
  - when the dynamic lift-off has been completed, controls the derricking action of the boom to stop the boom by using the control signal to which the filter is applied by the filter application unit, and
- wherein the load detection unit, the control unit, and the filter application unit are each implemented via at least one processor.

2. The dynamic lift-off control device according to claim 1, wherein the filter has a frequency characteristic that dampens a natural frequency of the boom according to a length of the boom and/or a telescopic pattern of the boom.

3. The dynamic lift-off control device according to claim 1, wherein the control unit determines that the dynamic lift-off has been completed when a first maximum value in a value detected by the load detection unit is detected.

4. The dynamic lift-off control device according to claim 1, wherein the control unit controls the winch to wind the winch at a constant speed in the dynamic lift-off control.

5. The dynamic lift-off control device according to claim 1, further comprising
- a posture detection unit that detects posture information of the boom,
- wherein the control unit:
  - selects a corresponding characteristic table or transfer function on a basis of an initial value of the posture information and an initial value of the load; and
  - predicts the amount of change in the derricking angle of the boom on a basis of the characteristic table or the transfer function and the change over time in the load, and
- wherein the posture detection unit is implemented via at least one processor.

6. A crane comprising the dynamic lift-off control device according to claim 1.

* * * * *